April 25, 1961   H. Z. GORA   2,980,961
MOLDING APPARATUS
Filed Nov. 4, 1958   4 Sheets-Sheet 1

INVENTOR.
Henry Z. Gora
BY
Johnson and Kline
ATTORNEYS

April 25, 1961

H. Z. GORA 2,980,961

MOLDING APPARATUS

Filed Nov. 4, 1958

INVENTOR.
Henry Z. Gora
BY
Johnson and Kline
ATTORNEYS

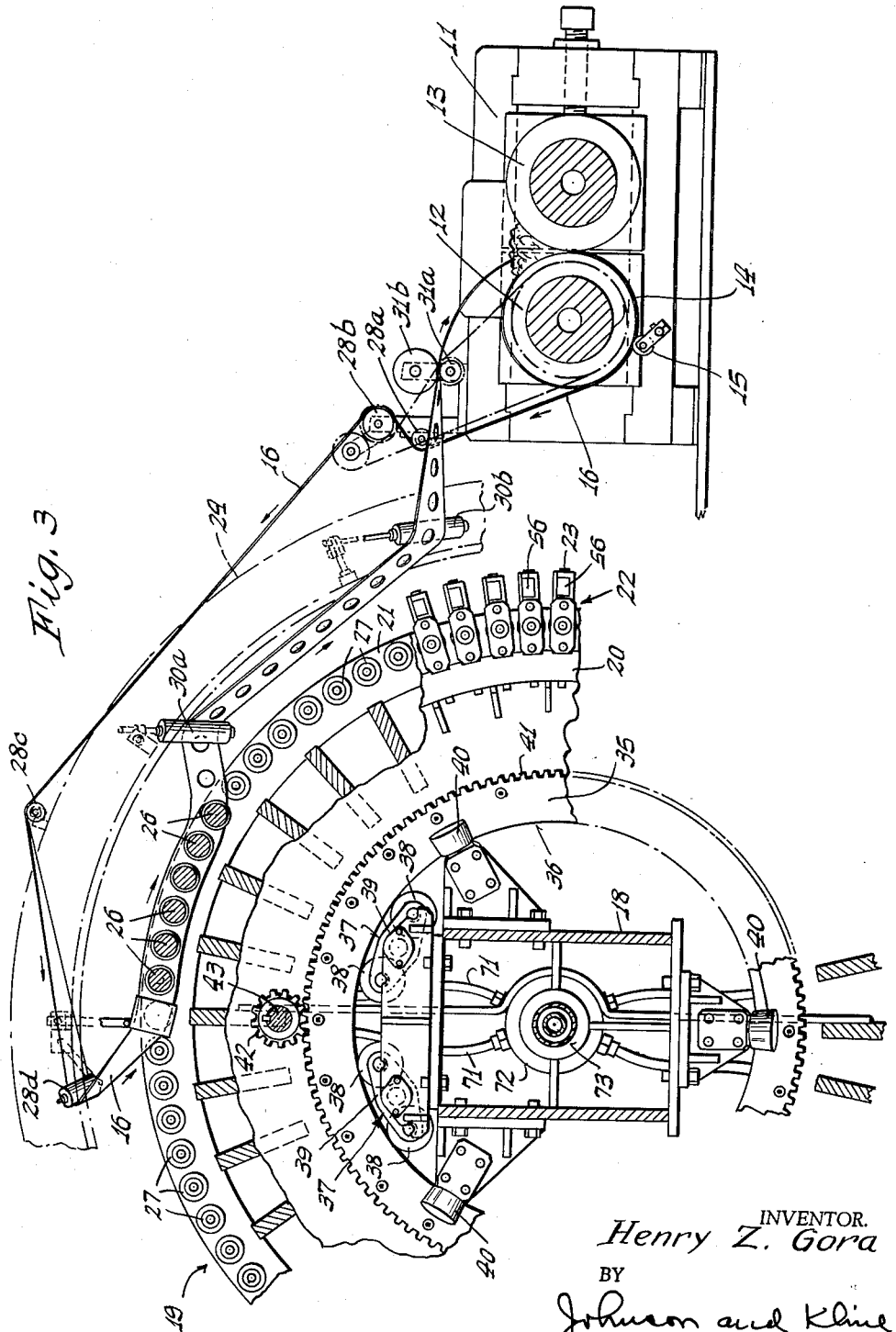

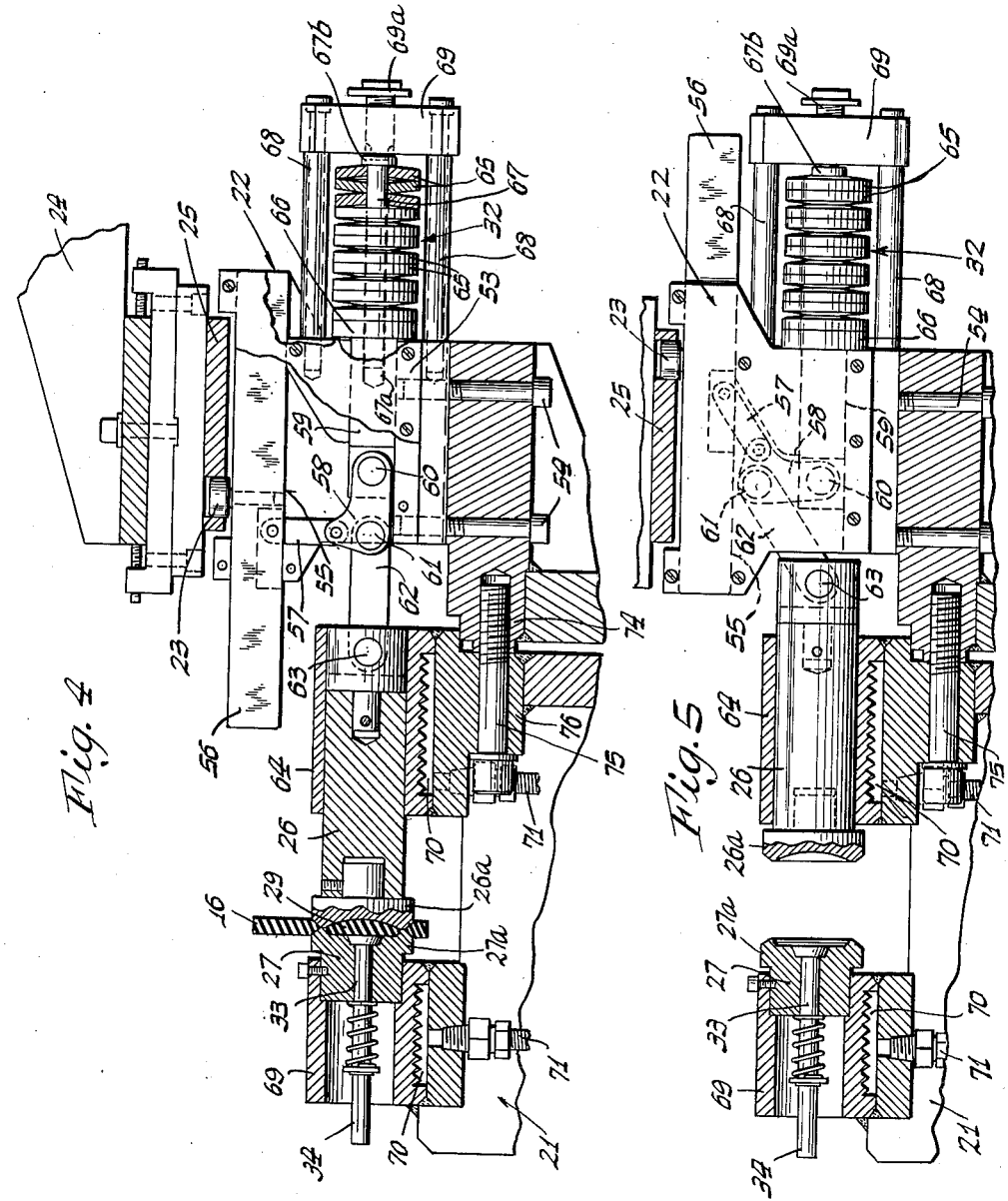

United States Patent Office 2,980,961
Patented Apr. 25, 1961

2,980,961

MOLDING APPARATUS

Henry Z. Gora, Stratford, Conn., assignor to The Eagle-Picher Company, Cincinnati, Ohio, a corporation of Ohio Filed Nov. 4, 1958, Ser. No. 771,863

12 Claims. (Cl. 18—21)

This invention relates to the molding of articles from plastic material. More specifically, it pertains to an apparatus for continuously molding plastic articles at high speeds.

Prior to this invention, I disclosed a method of molding articles which included the steps of plasticizing material, producing an endless strip thereof and passing the latter between pairs of cooperating die members which blank material from the strip and mold it to shape.

I provided a series of pairs of axially aligned die members being mounted in parallel relation on a carrier in the form of a wheel to travel in a closed path. A strip of plasticized material was guided longitudinally into a space between the die members when open and thereafter the die members were closed on the strip to blank out and mold a portion of the strip in the die cavities. The cavities were kept closed during most of the travel of the die members in their cycle of movement to set the material to the desired shape and size, and then the dies were opened and the molded article was ejected therefrom.

When the dies are closed the strip of plasticized material follows the path of the die members only long enough for the die members to be brought together on the strip to blank a quantity of material therefrom and deposit it in the die cavity. After this the die members may be separated so the strip is guided out of the path of the die members leaving the blank in one of the cavities, or the strip of molding material may be ripped or otherwise pulled off the closed dies.

The present invention is an improvment on my prior molding apparatus and has, as an object, the provision of molding apparatus which is adapted to the production of relatively large molded articles requiring relatively long semicuring periods.

In order to achieve the above-noted object, I have provided the molding apparatus with a relatively large die member carrier which is capable of utilizing relatively large die members and carrying such die members along a path of travel of substantially increased length so that the larger articles of greater mass may be semicured in each cycle of operation of the carrier comparable to the curing of smaller articles in apparatus using a smaller carrier.

The relatively larger die carrier of the present invention is also capable of carrying a relatively greater number of smaller die members along a path of travel substantially increased in length, thereby substantially increasing the production capacity of the apparatus.

I have found, that to mount my enlarged die carrier on an axle in the frame of a molding machine in the conventional manner is unsatisfactory because of the great weight which had to be supported and because of the excessive expansion and contraction which the carrier would be required to undergo during the heating and cooling of the die members incident to the repeated operation of the apparatus.

To overcome these difficulties, I have devised an improved suspension system for rotatably supporting the enlarged die carrier on the stationary frame portions of the apparatus. For this purpose, the carrier is made in the form of a centerless wheel or annulus and it is suspended on rollers or other forms of bearings mounted on the frame of the machine and engaging an internal track on the annulus.

According to the present invention, the annulus is power driven by suitable means so positioned with relation to the supporting rollers as to maintain driving engagement with the annulus in all positions of the annulus.

Another object of this invention is to provide an improved driving means for rotating a large die carrier through a molding cycle without displacing the same relative to the stationary frame.

It is still further an object of the invention to provide a molding apparatus adapted to the production of relatively large molded articles that require a relatively long semicuring period, which includes an enlarged rotatable annular frame or drum type die carrier floatingly mounted for rotation relative to a stationary frame.

Other objects and advantages of the invention will be apparent from the specification and claims when considered in connection with the attached sheets of drawings, illustrating one form of the invention, wherein like characters represent like parts and in which:

Fig. 3 is a fragmentary side elevational view, partially in section, of the molding apparatus;

Fig. 4 is a detail view, partially broken away and in section, of a pair of die members with their related operating mechanism, the die members and operating mechanism being illustrated in die closed position; and Fig. 5 is a detail view, partially in section, of the pair of die members and their associated operating mechanism of Fig. 4, shown in die open position.

Figure 1:
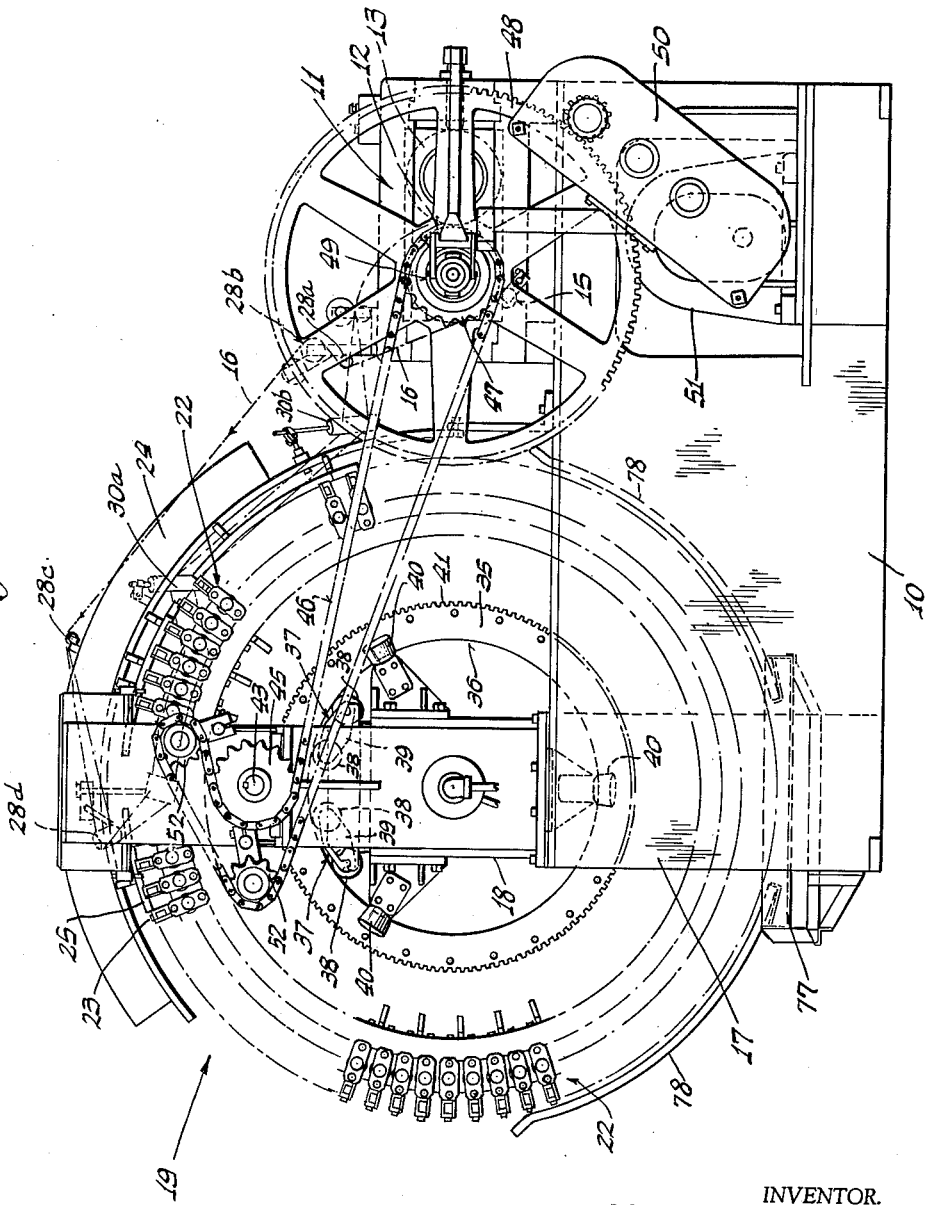
Fig. 1 is an illustrative side elevational view of the improved molding apparatus of the invention.

Referring now to the drawings, the molding apparatus embodying the concepts of the invention comprises a frame 10 having mounted on one end thereof a mill assembly 11 including a pair of mill rollers 12 and 13 on which a quantity of moldable material, such as rubber or similar material, may be plasticized to form on the roller 12 an enveloping layer 14 of determinate thickness. The thickness of the layer 14 is controlled by the spacing between the mill rollers. Cutters 15 remove from the layer 14 a strip 16 having a determinate width and the void which then results in the layer 14 is filled by migration of the material in the bank so that the strip 16 is continuous as long as the bank is maintained and the machine is operated.

At the end of frame 10, directed away from mill assembly 11, a vertically extending post 17 is formed having a substantially horizontal extension 18 extending therefrom. A carrier assembly or annular frame 19 in the form of a drum or wheel is floatingly suspended for rotation on horizontal extension 18 of post 17. The carrier assembly includes two parts 20 and 21, the part 20 being operably connected to horizontal extension 18 of post 17 through a floating suspension system, to be hereinafter described, and the part 21 being in the form of a substantially annular ring carried by the part 20. The part 20 has removably mounted on its periphery a series of closely spaced operating units 22, each of which includes a cam follower 23. Secured to frame 10 and overlying the carrier part 20 for a large arc of the latter's movement is a cam support 24 on which a plurality of cams 25 are adjustably mounted in position to be engaged by the follower 23 as the carrier rotates. Mounted on part 21 of the carrier is a series of closely spaced pairs of coaxially aligned die members 26 and 27 which are adapted to be moved from separated to engaged position.

As illustrated, the die members 26 are mounted to move axially toward the die members 27 and each is connected to an axially aligned operating unit 22 through which it is operated by the cams 25 on the cam support 24 during the rotation of the carrier. In the form of the invention illustrated, the die members 27 are mounted so as not to be movable for molding purposes.

In the open position of the die members, a space is provided into which the strip 16 is guided from the mill roller 12 by guides 28a, 28b, 28c and 28d which are set at such angles that the normally horizontally disposed strip is twisted to lie in a vertical plane to enter the space between the die members substantially tangentially to the path of the die members. When strip 16 is located between the open die members, the die member 26 is operated by operating unit 22 and moved to closed position to engage the strip 16 and press it against the die member 27 with sufficient force to sever a blank 29 from the strip and deposit it in the cavity between the die members. The strip 16 which is wider than the working ends of the die members, is impaled on the die member which penetrates it and is carried around with the drum by that die member. When the material to be molded is to be semi-cured, the die members 26 and 27 are heated through their supporting ends, in a manner to be hereinafter explained.

The strip 16, which is impaled on a die member and carried around the drum therewith, is carried along with the die members for only so long a period as is necessary to control the strip and partially form the blank. Consequently, the die closing cam 25 is of such a nature that, after a few succeeding pairs of die members have impaled the strip 16, the movable die member 26 recedes to open position and the strip 16 is stripped from the die member, which impales it, by a stripper of any type commonly known to the art. After the strip is released from the path of the die members it is guided from the path thereof by guide rollers 30a and 30b back to the bank in the mill assembly 11 to there commingle with the bank. The strip is assisted in its return to the bank by power driven feed roller 31a and pressure roller 31b which engage it. It will be understood that strip 16 may be removed from between the die members, if desired, by merely ripping or similarly pulling it out of their path.

By quickly removing the skeletonized strip 16 from engagement with the die members, the danger of partially curing the material forming the strip by prolonged contact with the heated die members is avoided and the strip is returned to the mill at substantially the same temperature as that at which it left.

The short period of time during which the die members are closed to form the blank is not always sufficient to set the material being molded, and therefore, precision molded articles are not produced. In order to perform precision molding, as soon as the strip 16 is removed leaving the blank in the cavity of one of the die members, the movable die member is again moved to closed position by another lobe of the cam 25 so that the blank is subjected to heat while confined in the cavity between the die members 26 and 27.

As was described above, according to my prior inventions, the article or blank is not discharged from the die members 26 and 27 until they are again opened to receive the strip 16. It will be understood that during the travel of the die members in their circular path, the blank is semicured and it will be further understood that the length of the path and the time it takes the die members to travel the same will determine the length of the semicuring operation. If, due to the type of material being molded, it should require less time for the moldable material to be semicured, the speed of rotation of the carrier can be increased. As an incident of the increase in rotational speed the rate of production of the apparatus will be proportionately increased.

As is conventional practice in the molding art, the timing of the operations should take into consideration such factors as the kind of material being used, the volume of the article being produced, its maximum cross-sectional thickness, the hardness desired, and the safe temperatures at which the material may be processed.

After the strip 16 has been released from between the die members 26 and 27, as afore-described, and the die members are again closed on the blank, the latter expands and tends to overflow the die cavity and escape past the cutoff surface between the die members. As was disclosed in my prior inventions, when the pressure within the cavity reaches a predetermined value, resilient means 32, to be hereinafter more fully described, in the operating unit 22 permit the movable die member to back off slightly from the fixed die member. After the pressure has been dissipated the resilient means function to again close the die cavity. In order to facilitate the escape of excess material during the initial forming of the blank, the cam 25 includes means for slightly retracting and advancing the movable die member 26 one or more times as the heating of the blank progresses. The repeated opening and closing of the die cavity permits air or other gases which may be trapped in the cavity to escape and the excess material therein is allowed to remain attached to the strip 16, which during the repeated venting of the die cavity is still carried along with the die members.

After the die members have completed a full molding cycle, the movable die member 26 is retracted by the cam 25 through the operation of operating unit 22 and the molded article is ejected from the fixed die member 27, which carries it. In order to facilitate the ejection of the molded article, the fixed die member 27 is provided with an axially disposed ejector plunger 33 having an extension 34 adapted to be engaged by a cam (not shown) carried by the frame of the machine. As the carrier 19 rotates, the plunger extension engages the cam and the article within the fixed die is punched from the cavity. The ejected article which falls from the space between the die members 26 and 27 may be guided by a chute or similar means (not shown) to a conveyor belt (also not shown) which in turn carries it through a vulcanizing chamber or similar processing area.

According to the instant invention, the rotatable die member carrier or annular frame 19 is of substantially increased size over that which was previously contemplated, to facilitate the utilization of larger molding dies without a decrease in productive capacity or to increase production by the utilization of a greater number of small dies. I have found that the over size die member carrier cannot practically be rotatably supported in the conventional manner, as by means of an axle and bearing structure. The conventional suspension means would, if utilized with the enlarged carrier, be extremely expensive since it must be adapted to support excessive weight and withstand extreme variations in expansion and contraction. In order to overcome this problem I have floatingly supported the carrier on the frame of the apparatus so that it is readily self-adjustable in response to variations caused by changes in operating temperature.

The die member carrier 19 is floatingly supported on the frame of the apparatus through an annular member 35 forming part of carrier part 20. The inner surface of annular member 35 provides a circular internal track 36, which is concentric with the annular carrier, and is adapted to be engaged by bearing means 37 mounted on the horizontal extension 18 of frame post 17. It is contemplated that the bearing means will comprise two pairs of spaced rollers 38, each pair of rollers being positioned on an opposed side of the vertical center line of annular frame 19 and the rollers of each pair being rotatably mounted on a rocker frame 39. The rocker frame is pivotally mounted, in any conventional manner known to the art, on the horizontal extension 18 of the frame. In order to maintain annular frame or carrier 19 in vertical position, stabilizing bearings 40 are connected to horizontal extension 18 to engage annular member 35 along the vertical side faces thereof. It will be understood that the stabilizing bearings 40 should be of a structure which will facilitate the free rotation of annular member 35 and die member carrier 19 and preferably should be freely rotatable relative to their support.

In the absence of a conventional axle structure for rotating annular frame 19, I have devised a novel drive which includes forming an annular gear 41 as part of the carrier structure. While the annular gear may be a unitary structure connected to the carrier and concentric therewith, in the illustrated embodiment of the invention the annular gear 41 is an integral part of annular member 35 and forms the outer surface thereof. A power driven driving gear 42 is provided to mesh with annular gear 41 and drive the same to rotate the annular frame or carrier 19. Driving gear 42, which is mounted by a rotatable shaft 43, journaled as at 44 on frame 10, is itself driven by toothed gear 45 connected at the opposite end of shaft 43. Toothed gear 45 is driven, through chain belt 46, clutch gear 47, power wheel 48, clutch assembly 49 and conventional gear train 50, by motor 51. Stack or tightening pulleys 52 may be utilized in the conventional manner for stabilizing the drive as best illustrated in Fig. 1.

It will be understood, on reference to Fig. 1, that motor 51 drives power wheel 48 through gear train 50 which may be of any type commonly known to the art. The power wheel, which is mounted on a common axle with roller 12, of mill assembly 11, operates to continuously drive the roller to feed the strip 16 of moldable material to the die members. When it is desired to operate carrier 19 so that the die members are traveled through the molding cycle, clutch 47 is actuated to frictionally engage clutch gear 47 with power wheel 48. On so engaging clutch gear 47, power driven drive gear 42 is turned, through belt 46 and toothed gear 45 to drive annular gear 41, thereby rotating carrier 19. I have found that, by positioning power driven drive gear 42 to intersect the vertical center line of annular frame or carrier 19, the carrier is stabilized during operation and maintained in operable engagement with supporting bearing means 37.

Referring now to Figs. 4 and 5, the operating unit 22 comprises a separate housing 53, the base of which is removably secured in a keyway in carrier part 20 by bolts 54 in substantial axial alignment with the die members 26 and 27. The upper portion of housing 53 is formed with a guideway 55 to receive a slide bar 56 adapted to reciprocate therein, the bar carrying the cam follower 23 which, as aforenoted operably engages cams 25 carried by cam support 24. The lower part of the bar 56 pivotally carries a link 57 which has its end directed away from the bar pivotally connected to a bell crank 58. The bell crank is pivotally connected to a bar 59 by a pin 60, which constitutes the relatively fixed pivot point of the bell crank. The bell crank is further pivotally connected as at 61 with a link 62 which in turn is pivotally connected as at 63 to the movable die member 26 which reciprocates in a ring 64 forming part of the carrier part 21. When the reciprocating slide bar 56 is in the position shown in Fig. 5 the die member 26 is in retracted position. When the slide bar is moved by the cam 25, through follower 23 to the left as shown in Fig. 4, the die member 26 is advanced and the pivotal connections 60, 61 and 63 are brought into alignment so that any force tending to separate the die members or open the die cavity will necessarily have to move the pivot point 60 of the bell crank, since the latter and the link 62 constitute a toggle which is locked when the die members are in die closed position. In the preferred form of the invention the toggle is locked when the link and bell crank move past their center or aligned position into abutment with a surface or portion of housing 53. The toggle is unlocked and the die members are separated by the action of cam 25 on follower 23 which moves the follower to the right as seen in Fig. 5.

In order to maintain the die cavity closed under a yielding resilient force, the bar 59, which engages bell crank 58 at pivot point 60, is slidably mounted in the housing 53 and is yieldingly held against moving to the right as shown in Fig. 4 by a pile of resilient cup-shaped spring disks 65 having a disk 66 which engages the end of the rod 59. The spring disks 65 and disk 66 have aligned central apertures through which extends a guide rod 67, the inner end of which has a sliding fit in a hole 67a in the bar 59. The outer end of the rod 67 has a head 67b which engages the terminal spring disk 65.

In order to place the disks 65 under tension and be able to regulate the tension and thereby the resistance that the spring disks 65 may apply to the bar 59, the housing 53 has secured to it a pair of rods 68 connected at their ends by a cross bar 69. The bar 69 carries an adjustable screw 69a, the inner end of which engages the head 67b of the rod 67. By rotating the screw, the rod 67 is forced inwardly, thus placing the disks 65 under tension.

It should be noted that in the Fig. 4 position of the parts, the die members are closed but the end bar 59 projects beyond the housing slightly and is in engagement with the disk 66. Thus, the spring disks 65 maintain the dies in yielding engagement even in their closed positions. In the fully open position of the dies, the bar 59 recedes within the housing allowing the end disk 66 to engage the side of the housing. Hence, in the open position of the die members the toggle mechanism is not under tension of the spring disks 65. When the die cavity is closed, any force acting to open it, for instance the expansion of the material within the cavity or gases therein, is transmitted through link 62, bell crank 58 and pivot point 60 to bar 59 which is permitted to yield by the pairs of resilient cup-shaped members 65. On the pressure within the cavity being dissipated, the resilient cup-shaped members act to return movable die member 26 to die closed position. It should be also noted that the resiliently backed, or floating, toggle functions during the initial closing of the die cavity and prevents damage to the die members during the penetration of strip 16 in the formation of the blank 29.

The operating unit 22, as above described, is a unitary assembly which is removably connected to the carrier and which, with the movable die member 26 and connected bar 59 may be completely and bodily removed from the carrier, by removing bolts 54, for repair and/or replacement of the unit, as necessary. The die heads 26a and 27a of die members 26 and 27 are removable for the substitution of new heads to facilitate the production of different size or shaped articles.

Figure 2:
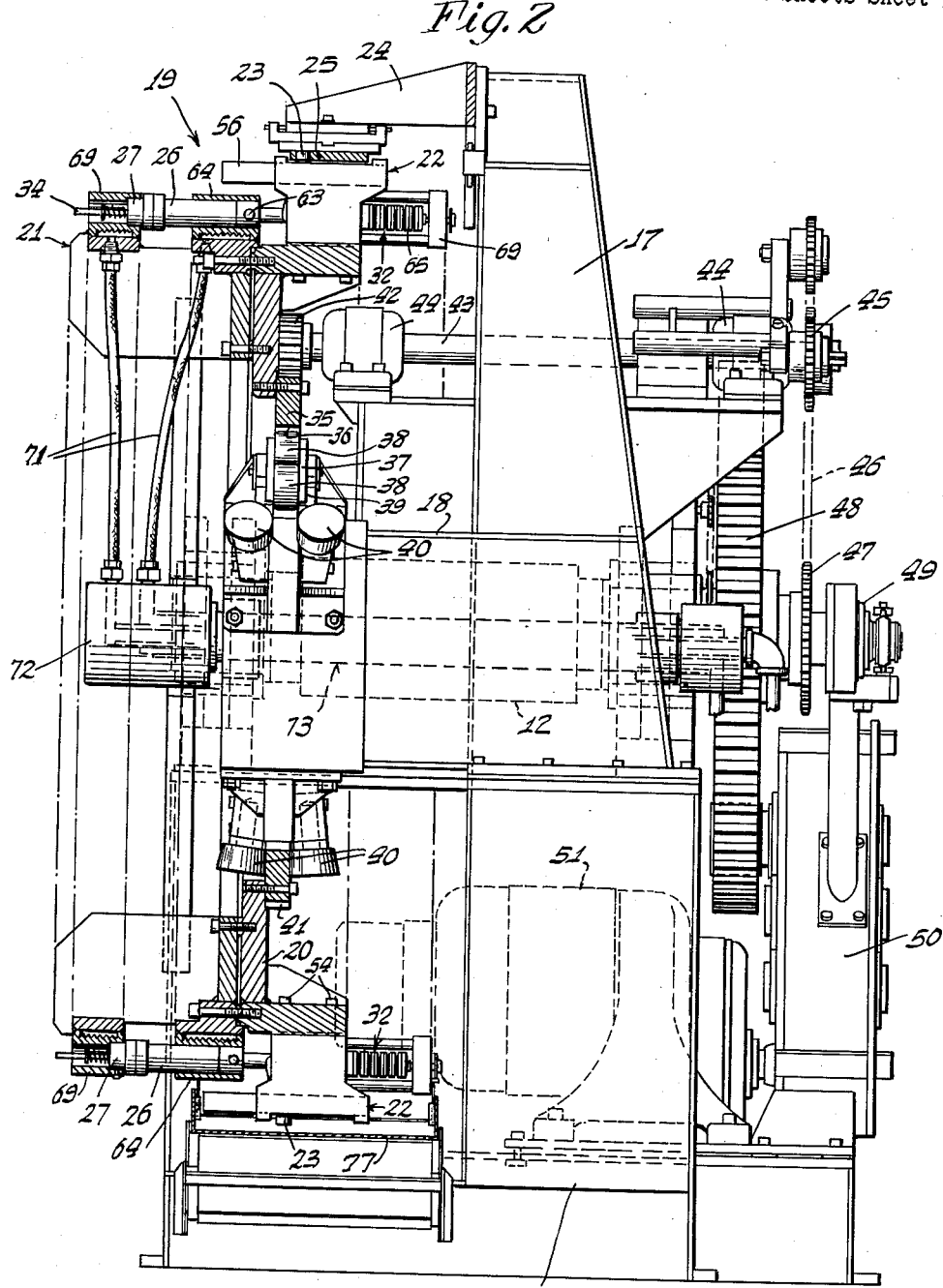
Fig. 2 is a front elevational view, partially in section, of the apparatus of Fig. 1.

As was previously discussed, the die members 26 and 27 are heated to facilitate the semicuring of the blank in the die cavity. In Figs. 4 and 5, the die members 26 and 27 are shown mounted in rings 64 and 69 respectively, on the part 21 of the carrier. The rings are formed with chambers 70 which are connected through conduits 71 to a rotatable coupling 72 (see Fig. 2) of any type commonly known to the art. The conduit through which steam or similar heating fluid is transmitted to the rings, is connected in the conventional manner through a fluid system 73, extending substantially axially through carrier 19, annular member 35 and horizontal extension 18 of the frame, to a source of steam or similar heating fluid not shown. It will be understood that the heating system will be of the type which may be operated as required by the particular molding operation being carried out.

When molding rubber or other thermoplastic materials which require the use of heat in their processing, it is necessary to avoid the transfer of heat from the die members and the carrier part 21 to the carrier part 20 and the operating units 22. This is accomplished by reducing the physical contact between the carrier parts 21 and 20 to as great a degree as possible without weakening the carrier structure. In the form of the invention illustrated, the reduction in physical contact between the parts is accomplished by having a small rim or flange 74, on carrier part 20 (see Figs. 4 and 5), fit within the ring 64 on the part 21, and thereafter passing bolts 75 through lugs 76 on the ring 64 into threaded openings in the flange 74. By means of the reduction in physical contact between the parts 20 and 21 and the resultant substantial elimination of heat transfer therebetween, the operating units 22 can be lubricated without encountering the difficulties commonly associated with operating equipment at high temperatures.

In view of the fact that the accurate and positively controlled operation of the die members is a function of slide bar 56 of operating unit 22, it is desirable to substantially continuously lubricate the slide bar so that it may reciprocate in the proper manner in response to the action of cam 25 on follower 23. I have achieved the desirable lubrication of slide bar 56 (see Figs. 1 and 2) by providing on frame 10, adjacent the bottom of post 17 and in line with the peripheral path of travel of carrier or annular frame 19, a trough 77 through which the portion of operating unit 22 containing slide bar 56 must pass. The trough, which contains oil or a similar lubricating substance, forms a bath for the slide bar. Shields 78 may be mounted on frame 10 at opposed sides of trough 77 to catch the excess lubricating substance dripping from operating unit 22 and return it to the trough.

Thus, among others, the several objects of the invention as aforenoted are achieved. Obviously numerous changes in the structure may be resorted to without departing from the spirit of the invention as defined by the claims.

I claim:

1. An apparatus for molding a continuous succession of articles comprising a stationary frame; a vertically disposed rotatable annular frame, said annular frame including a circular internal track concentric therewith; bearing means on said stationary frame adapted to operably engage the upper portion only of said track so that said annular frame is suspended for rotation therefrom; means including means on the stationary frame for rotating said annular frame; and a plurality of molding units mounted on said rotatable annular frame around the periphery thereof, said units each including a pair of axially aligned relatively movable die members, and means including means mounted on the stationary frame for moving said members horizontally and axially between separated and engaged position for molding an article therebetween.

2. An apparatus for molding a continuous succession of articles comprising a stationary frame; a vertically disposed rotatable annular frame, said annular frame including a circular internal track and an annular gear, said track and said gear being concentric with said annular frame; bearing means on said stationary frame adapted to operably engage the upper portion only of said track so that said annular frame is suspended for rotation therefrom; means for rotating said annular frame, said means including a power driven driving gear operably engaging said annular gear; and a plurality of molding units mounted on said rotatable annular frame around the periphery thereof.

3. An apparatus for molding a continuous succession of articles as in claim 2, wherein said circular internal track and said annular gear form the inner and outer surfaces of an annular member connected to said annular frame for rotation therewith.

4. An apparatus for molding a continuous succession of articles as in claim 3, and a plurality of spaced stabilizing bearing means engaging side surfaces of said annular member for maintaining said annular frame in vertical position.

5. An apparatus for molding a continuous succession of articles comprising a stationary frame; a vertically disposed rotatable annular frame, said annular frame including a circular internal track concentric therewith; bearing means on said stationary frame adapted to operably engage the upper portion only of said track so that said annular frame is suspended for rotation therefrom about a substantially horizontal axis; stabilizing bearing means operably engaging side surfaces of said annular frame for maintaining the same in vertical position; means for rotating said annular frame; and a plurality of molding units mounted on said rotatable annular frame around the periphery thereof.

6. An apparatus for molding a continuous succession of articles comprising a stationary frame; a vertically disposed rotatable annular frame, said annular frame including a circular internal track concentric therewith; bearing means on said stationary frame adapted to operably engage a portion of said track so that said annular frame is suspended for rotation therefrom, said bearing means including supporting rollers positioned on opposed sides of the vertical center line and entirely and substantially above the horizontal center line of said annular frame; means for rotating said annular frame; and a plurality of molding units mounted on said rotatable annular frame around the periphery thereof.

7. An apparatus for molding a continuous succession of articles comprising a stationary frame; a vertically disposed rotatable annular frame, said annular frame including a circular internal track and an annular gear, said track and said gear being concentric with said annular frame; bearing means on said stationary frame adapted to operably engage the upper portion only of said track and equispaced at opposite sides of the vertical center line of the annular frame so that said annular frame is suspended for rotation therefrom; means for rotating said annular frame, said means including a power driven driving gear operably engaging said annular gear substantially midway between the bearing means on said annular frame; and a plurality of molding units mounted on said rotatable annular frame around the periphery thereof.

8. An apparatus for molding a continuous succession of articles comprising a stationary frame; a vertically disposed rotatable annular frame, said annular frame including a circular internal track concentric therewith; bearing means on said stationary frame adaptaed to operably engage the upper portion only of said track so that said annular frame is suspended for rotation therefrom, said bearing means comprising two pairs of spaced rollers, the rollers of each pair being rotatably mounted on a rocker frame pivotally mounted on said stationary frame; means for rotating said annular frame; and a plurality of molding units mounted on said rotatable annular frame around the periphery thereof.

9. An apparatus for molding a continuous succession of articles comprising a stationary frame; a vertically disposed rotatable annular frame, said annular frame including a circular internal track concentric therewith; bearing means on said stationary frame adapted to operably engage the upper portion only of said track so that said annular frame is suspended for rotation therefrom; means for rotating said annular frame; a plurality of molding units mounted on said rotatable annular frame around the periphery thereof, said units each including a pair of axially aligned relatively movable die members and steam chamber means for heating said dies; and means located at the axis of said annular frame for supplying steam to said steam chamber means, said steam means including stationary conduit means and conduit means rotatable with said annular frame.

10. An apparatus for molding a continuous succession of articles comprising a stationary frame; a vertically disposed rotatable annular frame, said annular frame including a circular internal track concentric therewith; spaced bearing means on said stationary frame adapted to operably engage the upper internal portion only of said track so that said annular frame is suspended for rotation therefrom; means for rotating said annular frame; a plurality of self-locking molding units mounted on said rotatable annular frame around the periphery thereof, said units each including a pair of axially aligned relatively movable die members and operating means for moving said die members between separated and engaged position and locking said die members in engaged position; and means on said stationary frame operably within the space between said bearing means for actuating said operating means to move said die members between separated and engaged position and lock said die members in engaged position for molding an article therebetween.

11. An apparatus for molding a continuous succession of articles comprising a stationary frame; a vertically disposed rotatable annular frame, said annular frame including a circular internal track concentric therewith; bearing means on said stationary frame adapted to operably engage a portion of said track so that said annular frame is suspended for rotation therefrom, said bearing means including means positioned on opposed sides of the vertical center line defining a segment entirely and substantially above the horizontal center line of said annular frame; means for rotating said annular frame, a plurality of self-locking units mounted on said rotatable annular frame around the periphery thereof, said units each including a pair of axially aligned relatively movable die members and operating means for moving said die members between separated and engaged position and locking said die members in engaged position; and means mounted on said stationary frame within the segment defined by said means positioned at opposed sides of the vertical center line for actuating said operating means.

12. An apparatus for molding a continuous succession of articles as in claim 11, in which each of said bearing means comprises a rocker frame having a pair of anti-friction rollers engaging the internal track at spaced points, whereby the load of supporting the annular frame in suspended condition is equalized.

References Cited in the file of this patent

UNITED STATES PATENTS

| | | |
|---|---|---|
| 1,026,682 | Komarek | May 21, 1912 |
| 1,922,937 | Eckert | Aug. 15, 1933 |
| 2,094,079 | Parker | Sept. 28, 1937 |
| 2,287,675 | Fair et al. | June 23, 1942 |
| 2,375,955 | Smith | May 15, 1945 |
| 2,395,100 | Caron | Feb. 19, 1946 |
| 2,543,503 | Lester et al. | Feb. 27, 1951 |
| 2,561,021 | Groth | July 17, 1951 |
| 2,593,438 | Gora | Apr. 22, 1952 |
| 2,624,915 | Carson | Jan. 13, 1953 |
| 2,871,987 | Dubois | Feb. 3, 1959 |

FOREIGN PATENTS

| | | |
|---|---|---|
| 200,047 | Australia | Apr. 7, 1955 |
| 778,612 | Great Britain | July 10, 1957 |